United States Patent [19]
Sterken

[11] Patent Number: 6,000,349
[45] Date of Patent: Dec. 14, 1999

[54] ROLLABLE CONTAINER

[76] Inventor: Johan Sterken, Otmansweg 3, NL-7735 KA Ommen, Netherlands

[21] Appl. No.: 08/875,259
[22] PCT Filed: Jan. 23, 1995
[86] PCT No.: PCT/NL96/00037
 § 371 Date: Sep. 12, 1997
 § 102(e) Date: Sep. 12, 1997
[87] PCT Pub. No.: WO96/22685
 PCT Pub. Date: Aug. 1, 1996

[30] Foreign Application Priority Data

Jan. 23, 1995 [NL] Netherlands ............................ 9500123

[51] Int. Cl.$^6$ ...................................................... A01C 5/06
[52] U.S. Cl. .......................................... 111/118; 239/147
[58] Field of Search ..................... 111/118, 123, 111/128; 222/504, 608, 621, 627, 167; 239/147; 299/29; 280/836

[56] References Cited

U.S. PATENT DOCUMENTS

| | | | |
|---|---|---|---|
| 581,416 | 4/1897 | Dunn ...................................... | 222/167 X |
| 2,548,190 | 4/1951 | Arpin, Jr. .............................. | 280/836 X |
| 2,593,696 | 4/1952 | Pool .......................................... | 299/29 |
| 3,905,523 | 9/1975 | Ahlers et al. ............................ | 239/172 |
| 4,109,865 | 8/1978 | Hurtado T et al. ................. | 111/128 X |
| 4,218,015 | 8/1980 | Dean ........................................ | 239/147 |

FOREIGN PATENT DOCUMENTS

| | | |
|---|---|---|
| 943911 | 6/1956 | Germany . |
| 1280687 | 10/1968 | Germany . |
| 711697 | 7/1954 | United Kingdom . |

*Primary Examiner*—Robert E. Pezzuto
*Attorney, Agent, or Firm*—Webb Ziesenheim Logsdon Orkin & Hanson, P.C.

[57] ABSTRACT

The invention relates to a rollable container for storing, transporting and distributing a mass having little or no cohesion, for instances; liquids incorporating possibly solid constituents, such as liquid manure or fertilizer; or solid substances consisting of granules and/or powder. A container is provided in which the contact pressure with the ground is considerably reduced. The container is embodied as a hollow wheel, which is mounted via rotation bearings for rotation in a frame which is coupled or can be coupled by a coupling device to a motor vehicle, for instance a tractor, the space in the wheel being sealingly connected via a rotation bearing to a conduit which is stationary relative to the frame or at least occupies a substantially fixed position relative to the frame for supplying and discharging mass to and from the space, which wheel can roll over the ground during movement of the frame caused by the motor vehicle.

22 Claims, 20 Drawing Sheets

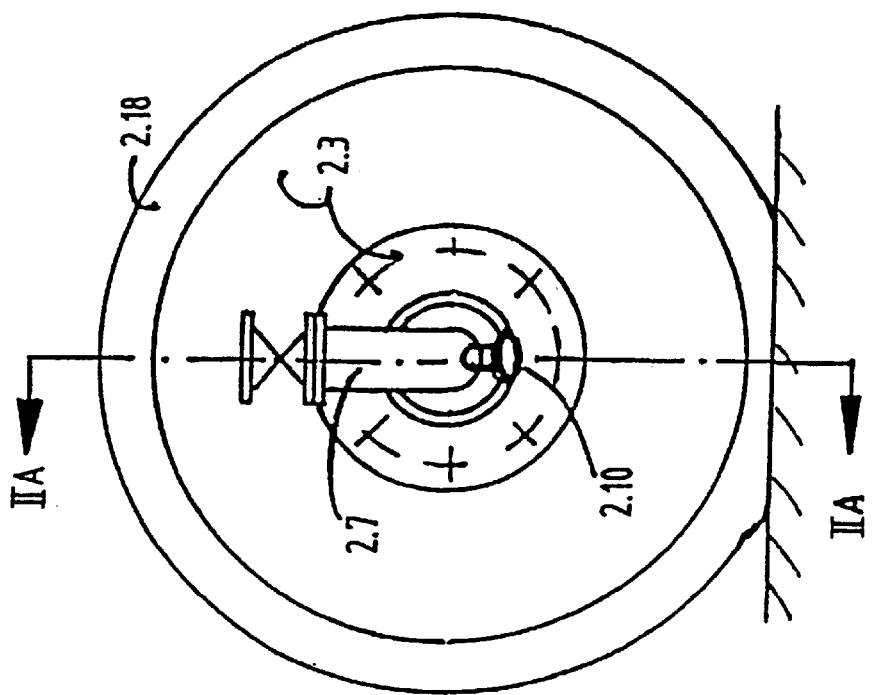
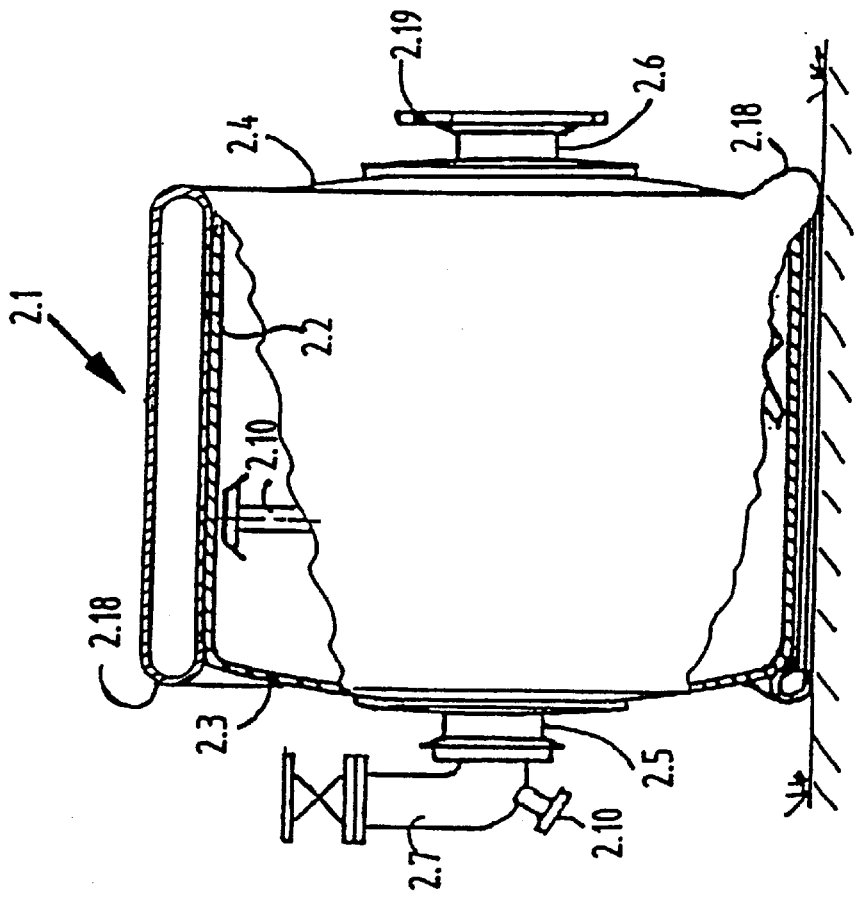

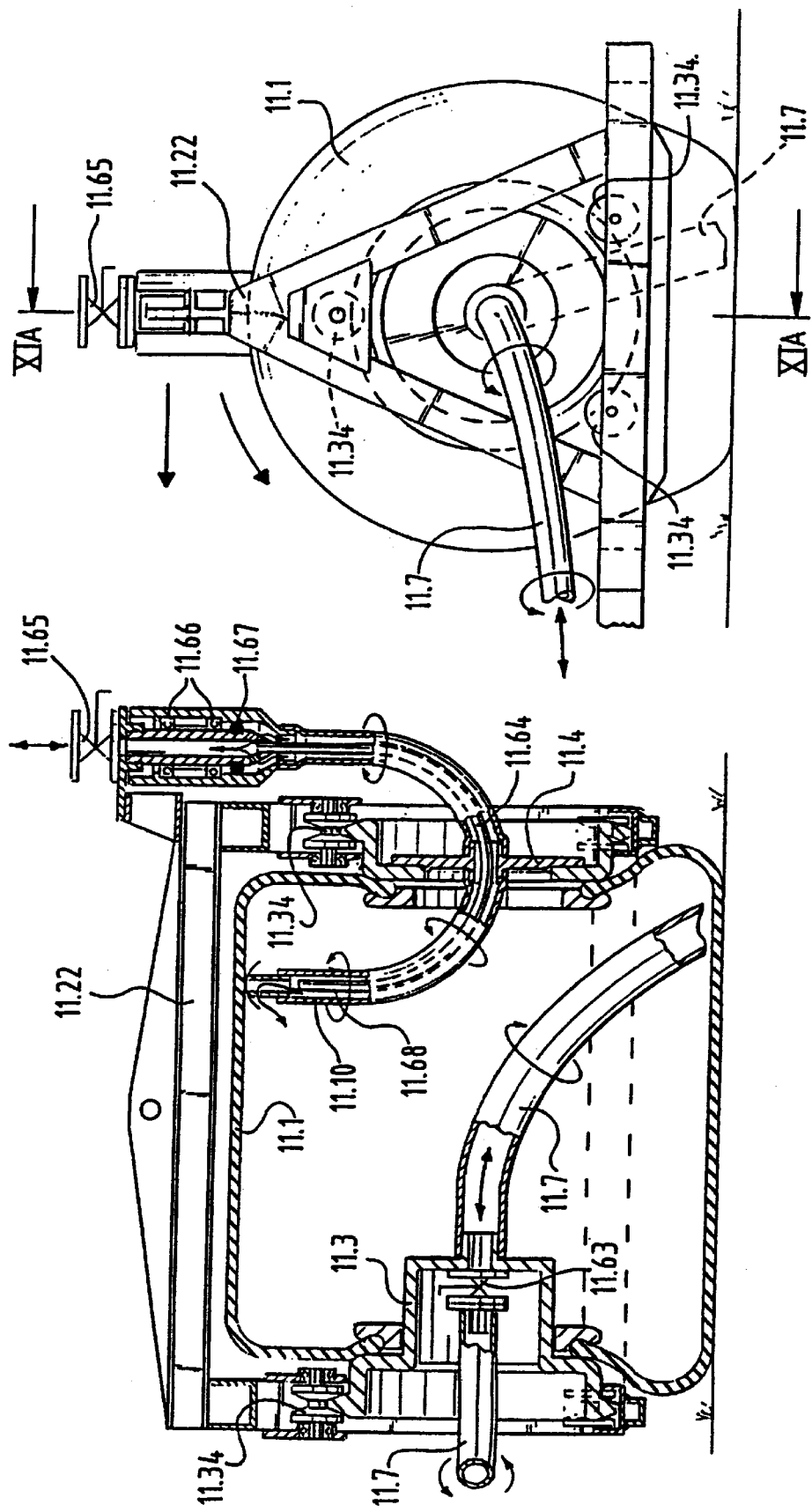

ROLLABLE CONTAINER

BACKGROUND OF THE INVENTION

The invention relates to a rollable container for storing, transporting and distributing a mass having little or no cohesion, for instance liquids incorporating possibly solid constituents, such as liquid manure or fertilizer, or solid substances consisting of granules and/or powder. Such a container is known in various embodiments.

In order for instance to apply and distribute liquid manure in or on farmland, use is made according to the prior art of a tank truck or tanker supported by a number of wheels with pneumatic tires to transport this manure on the road and over the land. The contact pressure between the pneumatic tires and the terrain driven over is often so high in this prior art that driving over agricultural land can result in structural decomposition of this land. Another possibility is that on particular terrains it is very difficult or even impossible to use liquid manure within the framework of statutory provisions. Understood by the designation "structural decomposition" is that the soil is compacted such that this adversely affects the growth of crops.

The invention has for its object to provide a container wherein the contact pressure with the ground is considerably reduced or can, at least in some conditions, be reduced to harmless proportions.

SUMMARY OF THE INVENTION

This is generally realized with a rollable container of the described type, which has the feature that the container is embodied as a hollow wheel, which is mounted via rotation bearings for rotation in a frame which is coupled or can be coupled by means of coupling means to a motor vehicle, for instance a tractor, the space in said wheel being sealingly connected via a rotation bearing to a conduit which is stationary relative to the frame or at least occupies a substantially fixed position relative to the frame for supplying and discharging mass to and from the space, which wheel can roll over the ground during movement of the frame caused by the motor vehicle.

An additional advantage of this structure according to the invention is that the centre of gravity of the container can be very low, which can be important for instance when the container is used in hilly areas.

In order to prevent structural decomposition in for instance peat grassland, the contact pressure with the ground should be lower than 1 bar. With the structure according to the invention this requirement can easily be met.

In a specific embodiment the container has the special feature that the wheel has a form-retaining peripheral outer surface.

An alternative embodiment has the special feature that the wheel has an elastically deformable and thus compressible peripheral outer surface. As the elastic compressibility increases, the contact surface between the container and the ground will increase and the contact pressure will therefore decrease.

An adjustment means enables an adjustment of at least one support wheel positioned on the frame and/or the container which effectively prevents rocking of the container during transport.

In order to give the container embodied as a wheel a sufficiently large capacity, use can for instance be made in practice of an outer diameter of more than 2 meters. An advantage of such a large diameter is the small rolling resistance and the correspondingly small pulling or pushing force for rolling displacement of the container. An additional advantage of the rolling displacement is that the content of the container is continuously in movement and is mixed.

BRIEF DESCRIPTION OF THE DRAWINGS

Further features and details will be stated and elucidated with reference to the annexed drawings. Herein:

FIG. 2a shows partially in side view, partially in cross section a variant with a flexible peripheral element;

FIG. 2b shows an axial side view of the container;

FIG. 5b shows a top view of the embodiment of FIG. 5a;

FIG. 6c shows a top view of the situation shown in FIG. 6a;

FIG. 9b shows a top view of a combination according to FIG. 9a;

FIG. 10b is a top view of the embodiment of FIG. 10a;

FIG. 11a shows a cross section of a container in which a supply and discharge conduit as well as a gas pressure conduit are placed stationary relative to the frame; and FIG. 11b shows a side view of the container according to FIG. 11a.

DESCRIPTION OF THE PREFERRED EMBODIMENTS

Figure 1B:
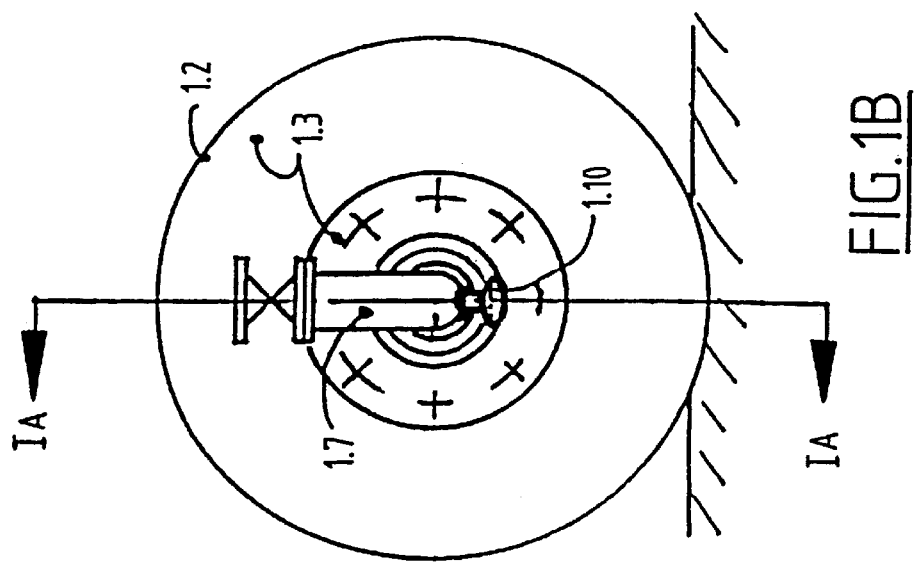
FIG. 1b shows an axial side view thereof.

Where possible and appropriate use is everywhere made in the following description of reference numerals wherein a component is designated on the one hand with the number of the relevant FIG. and on the other hand with a functional numerical addition which is as far as possible the same for a determined component in all the figures in which such a component occurs.

For the sake of clarity of the drawings and for the sake of the schematic representation, control units, conduits, cables and the like are omitted at particular locations.

Reference is made in this respect for instance to the control of the hydraulic cylinders 6.24, 7.24, 7.44, 8.24. It will be apparent that each controllable element must not only be connected to a power source, not drawn in some cases, but must also be controllable by means of control means which may or may not operate automatically.

Figure 1A:
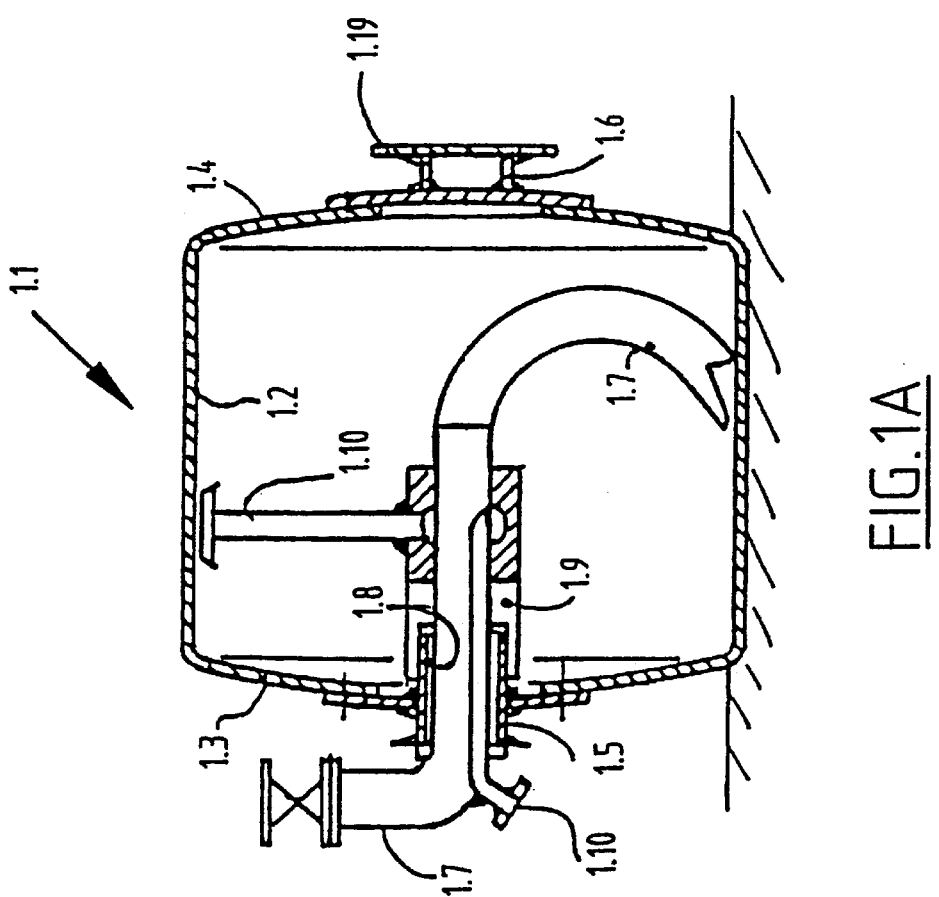
FIG. 1a shows a cross section through a substantially form-retaining container according to the invention.

Referring to FIG. 1 container 1.1 comprises a cylindrical part 1.2 and head ends 1.3 and 1.4. In FIG. 1a both head ends are provided with a pipe piece 1.5 and 1.6, the central axes of which coincide with the central axis of cylindrical part 1.2. A conduit 1.7 is carried through the pipe piece 1.5. This form-retaining or partly flexible conduit 1.7 can rotate in pipe piece 1.5 using bearing 1.8. Seal 1.9 protects bearing 1.8 against dirt and keeps the container airtight and liquid-tight. Conduit 1.10 offers the possibility of placing a pressure limiting device in connection with the space at the top of the wheel container 1.2, while this conduit can also serve to maintain an overpressure or underpressure in the containers. Pipe piece 1.6 is provided with a mounting flange 1.19 onto which a container drive unit can be mounted, in the case it is desired to drive the container in a frame.

FIGS. 2a and 2b show a container 2.1 embodied like that in FIG. 1a and 1b but now with a flexible compartment (comparable to a pneumatic tire) arranged on the periphery.

Figure 3B:
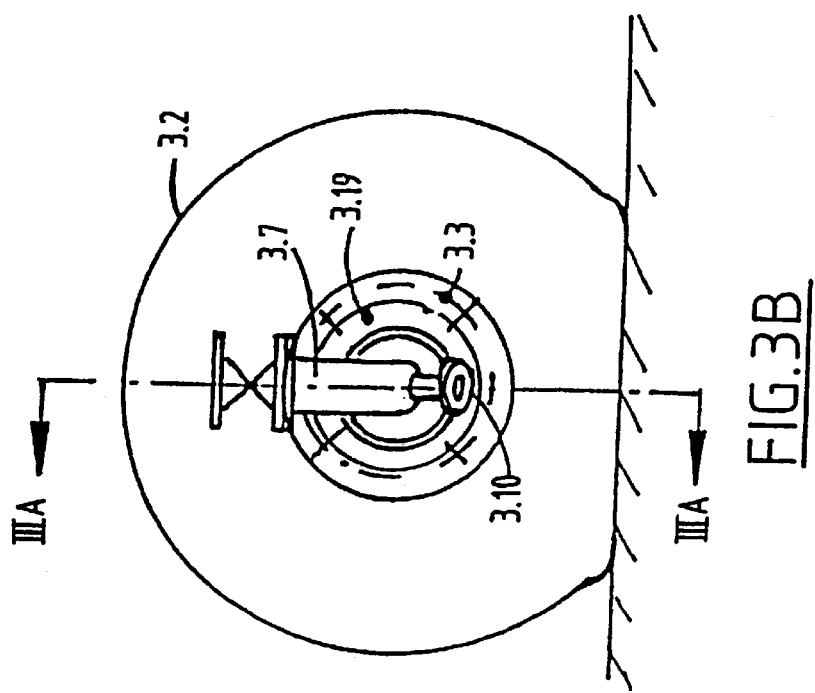
FIG. 3b is a view corresponding with FIGS. 1b and 2b.
Figure 3A:
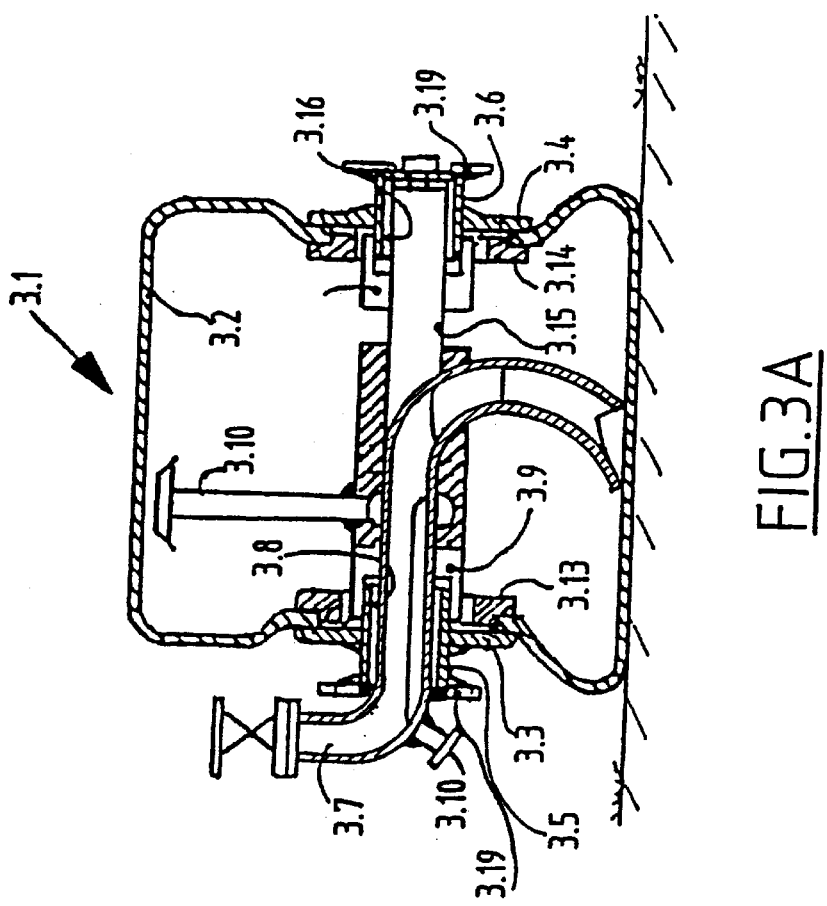
FIG. 3a shows a view corresponding with FIG. 1a of an embodiment which takes a substantially flexible form.

FIGS. 3a and 3b show a container 3.1 in a largely flexible embodiment.

The flexible part 3.2 is comparable to a low pressure pneumatic tire which is also used for swamp vehicles. The flexible container part 3.2 is connected in liquid-tight manner to the head ends 3.3 and 3.4 using pressure rings 3.13 and 3.14. Both head ends are provided as in FIGS. 1a and 1b with a pipe piece 3.5 and 3.6. Conduit 3.7 is here also carried through one of these pipe pieces. This form-retaining or partly flexible conduit 3.7 can here also rotate in pipe piece 3.5 using bearing 3.8. Seal 3.9 keeps container 3.1 liquid-tight and prevents fouling of bearing 3.8. Pipe 3.15, bearing 3.16, conduit 3.7 and bearing 3.8 provide an indirect connection of the head ends 3.3 and 3.4. Seal 3.17 protects bearing 3.16 against dirt. The conduit 3.10 can here also be provided with a pressure limiting device.

Figure 4A:
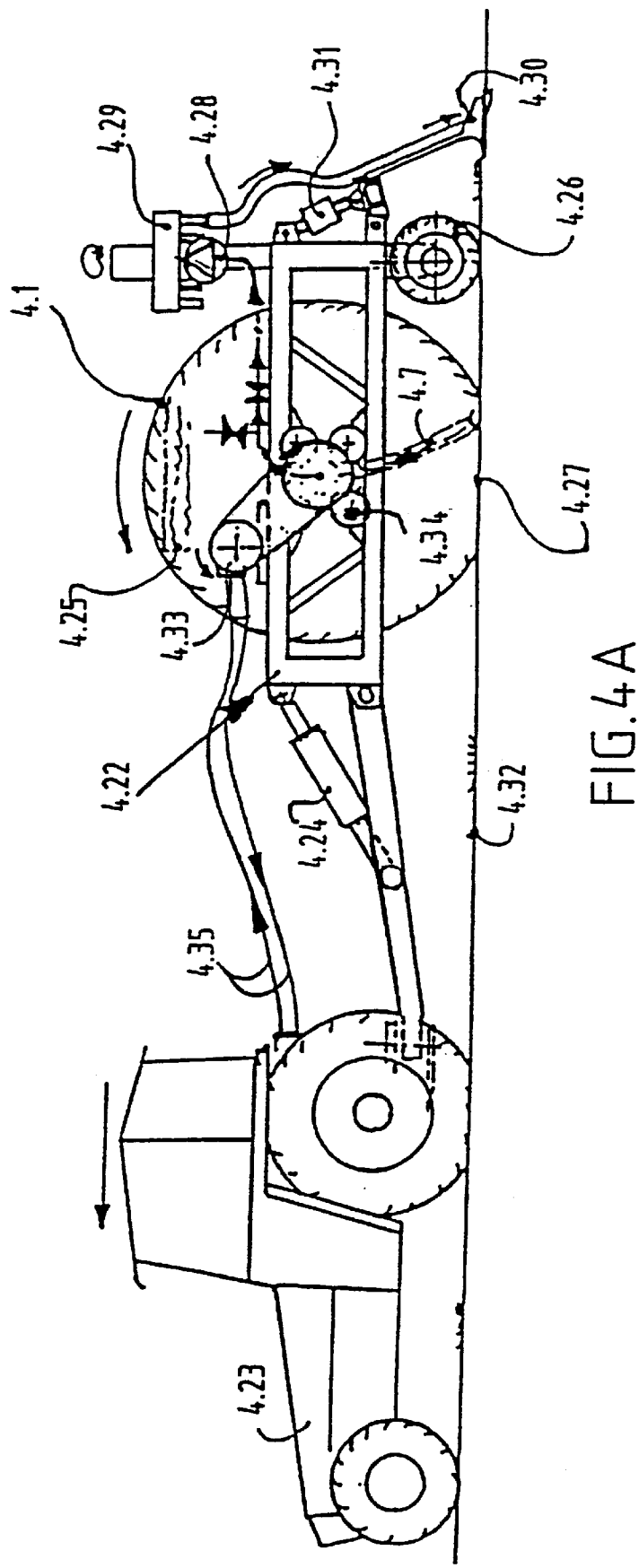
FIG. 4a is a side view, partly in schematic cross section, of an embodiment in the position in which the container rolls over the ground.
Figure 4B:
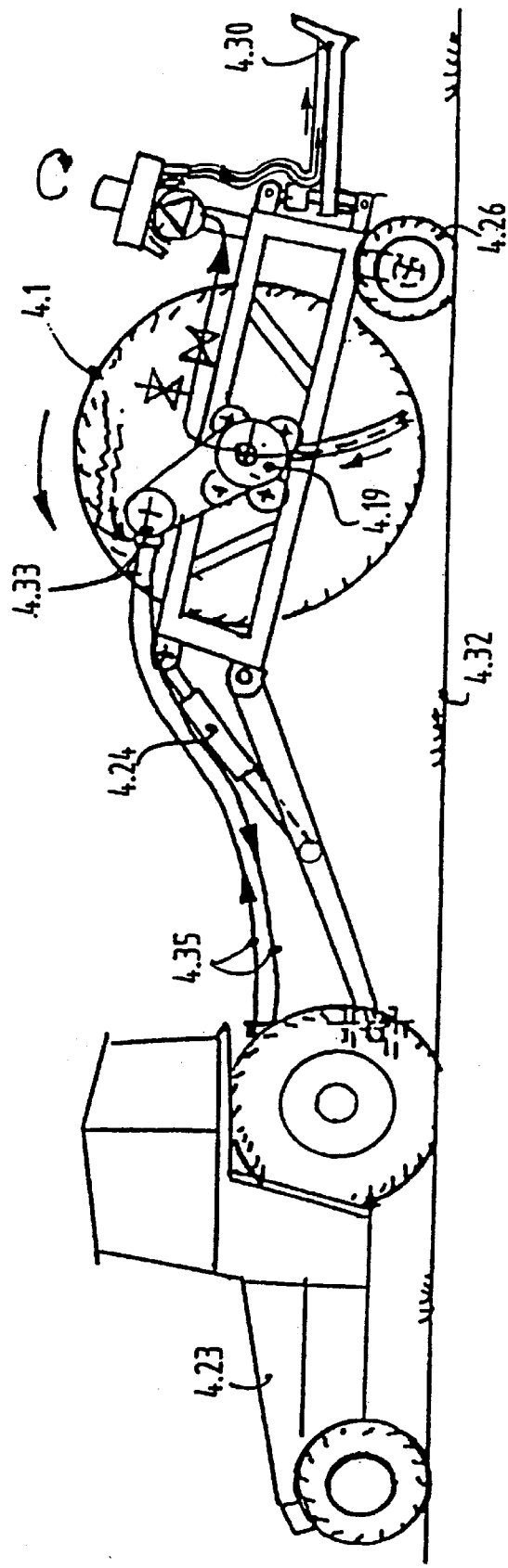
FIG. 4b shows a view corresponding with FIG. 4a of the situation in which the container is lifted from the ground.

FIGS. 4a and 4b show a frame 4.22 moved forward by a vehicle 4.23. In order to apply more or less liquid manure onto or into the ground the container 4.1 is enclosed rotatably in the frame 4.22 using rollers 4.34 such that for transport by road, for instance from the farm to the plot of land where the manure must be applied, the container can be lifted clear of the road or ground by the frame 4.22 using lifting cylinder 4.24. With drive unit 4.33 coupled to drive flange 4.19 the container content can be mixed during this transport, wherein the drive unit is fed from a power take-off of the vehicle via hydraulic hoses 4.35. On arrival at the plot of land for manuring, the frame 4.22 is placed in such a position using the lifting cylinder 4.24 that the weight of container 4.1 with its contents 4.25 is not supported via wheels 4.26 but directly on site via contact surface 4.27. Via conduit 4.7, pump 4.28, distributor 4.29 and distribution pipes 4.30 the container content can be spread in or over the terrain, while the frame 4.22 is pulled by vehicle 4.23. In the case of very poor ground 4.32 conditions, a driving couple can be exerted on the container using drive unit 4.33. Due to this extra drive, fitting of expensive low pressure tires on the tractive vehicle 4.23 can usually be dispensed with. The spreader unit 4.30 can be lifted clear of the ground 4.32 with cylinder 4.31. The invention offers the option of wholly adapting the choice of tire for the frame wheel to road transport, which increases the lifespan of these tires. The containers of FIGS. 1a thru 3b can be filled or emptied using a pump. Container pressure which is too high or too low can be prevented by limiting a vacuum respectively overpressure in the containers via conduit 1.10, 2.10 and 3.10 using a pressure limiting device.

The container 3.1 in a flexible embodiment can of course not be filled by creating a vacuum in the container, although this can however be carried out using a liquid pump. If the cylindrical part of a container such as 3.1 takes a partially flexible form, an air pressure can be created and maintained above the container content via conduit 3.10 such that with the thus obtained form retention of the container, the lifting height of the container in the frame 4.22 can remain limited and other additional provisions for supporting this type of container can be omitted.

Since the container 1.1 is a form-retaining embodiment, the contact pressure between container and ground will in many cases be too high to be able to exclude structural decomposition of the soil.

With the container embodiments 2.1 and 3.1 as shown in FIGS. 2a to 3b, low to very low contact surface pressures can be obtained between the container and the ground over which the transport takes place.

If in container 2.1 a very flexible pneumatic tire 2.18 is chosen as an elastic compartment round the container, the contact surface pressure is then substantially determined by the air pressure in compartment 2.18. This compartment functioning as a pneumatic tire does not have to comply with requirements relating to transport over asphalted roads because of the possibility in these situations of lifting the container in a frame clear of the ground or road.

Figure 5A:
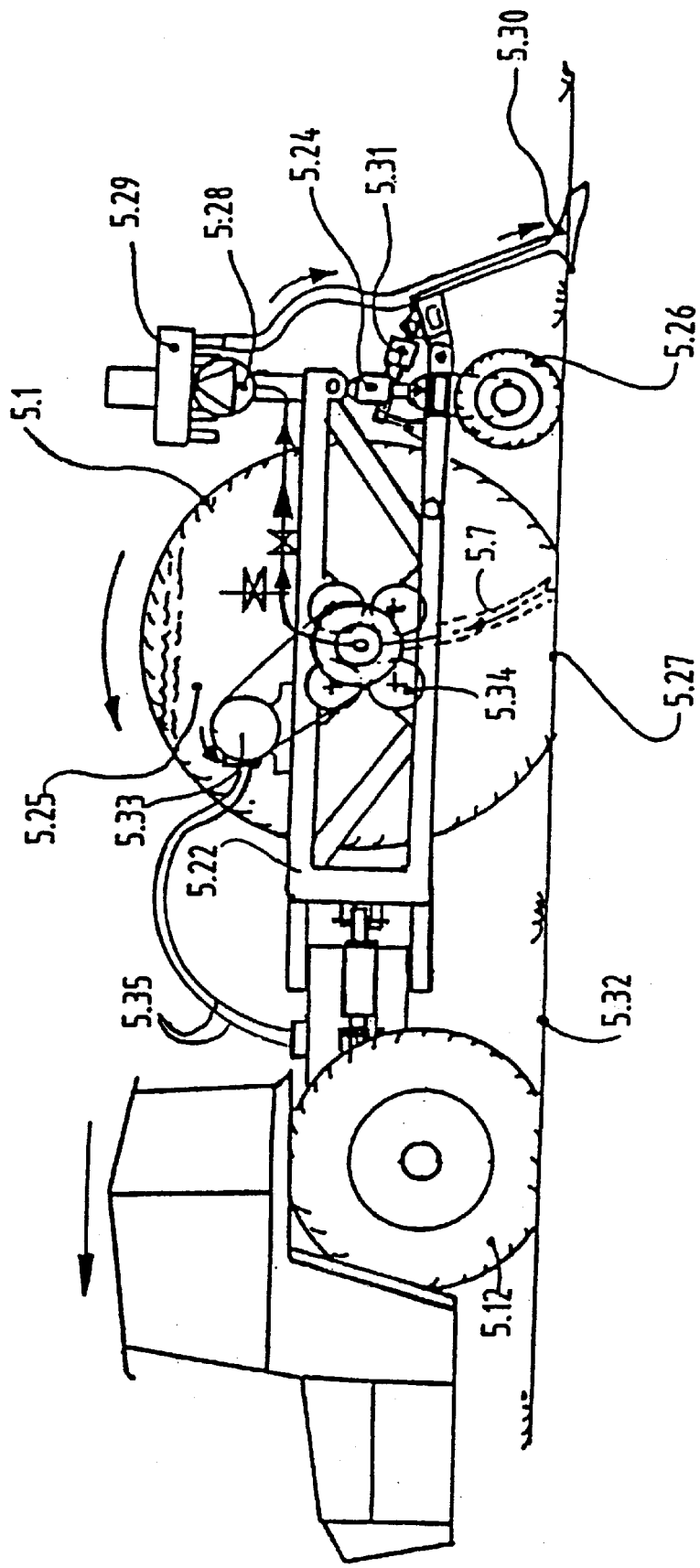
FIG. 5a shows a view corresponding with FIG. 4a of another embodiment.

FIGS. 5A and B show a self-propelling frame 5.22. The frame 5.22 is pulled by a tractor with rear wheels 5.12. Using lifting cylinders 5.24 the rollers 5.34 can lift clear of the road or ground the container 5.1 which is received rotatably in the frame. As in the case of the pulled embodiment according to FIG. 4, it is now also possible to mix the container content using drive unit 5.33 coupled to driving flange 5.19, wherein the drive unit 5.33 is fed via hydraulic hoses 5.35 from a power take-off of the frame drive motor. Here also the drive unit 5.33 can exert a driving couple on the container during application of the container content 5.25 onto or into the soil via suction conduit 5.7, pump 5.28, distributor 5.29 and distribution pipes 5.30, while the container 5.1 is situated in a position in which it is not lifted by lifting cylinders 5.31. Here too the frame wheels 5.26 can be adapted for road transport. During transport the manure distribution unit 5.29, 5.30 can here also be lifted clear of the ground 5.32 with hydraulic cylinder 5.31. The frame can be controlled using the double-action hydraulic cylinder 5.36.

Figure 6A:
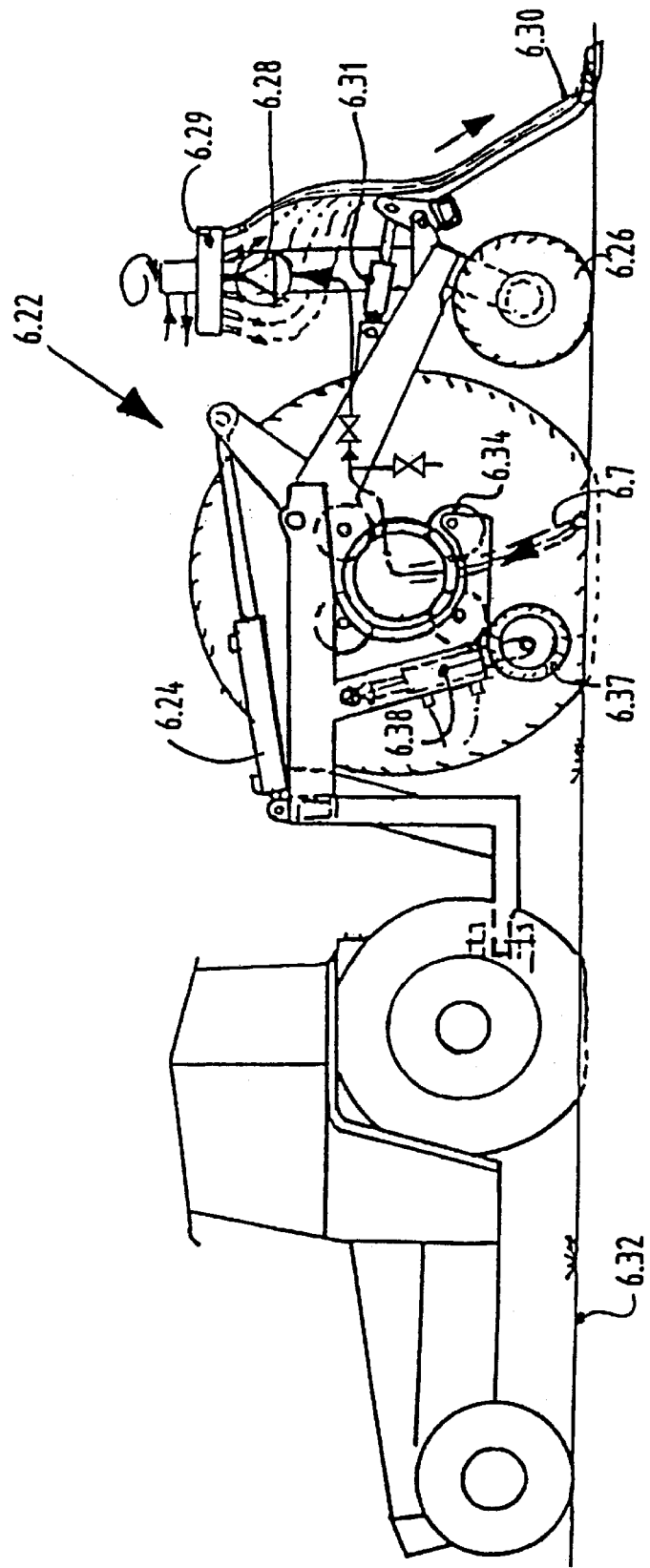
FIG. 6a is a side view of yet another embodiment.
Figure 6B:
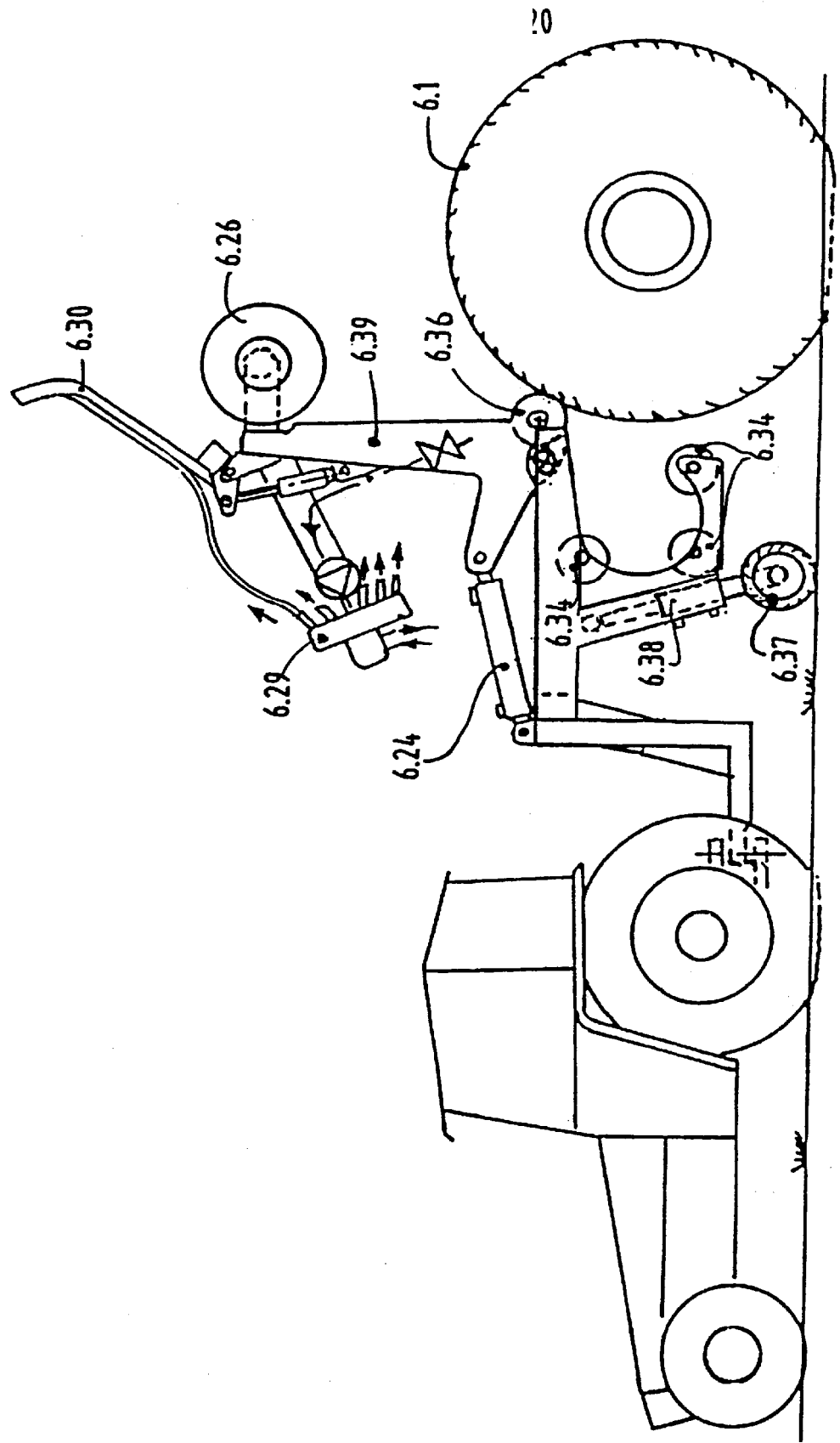
FIG. 6b shows a view corresponding with FIG. 6a of the situation in which the container is detached from the frame.
Figure 6C:
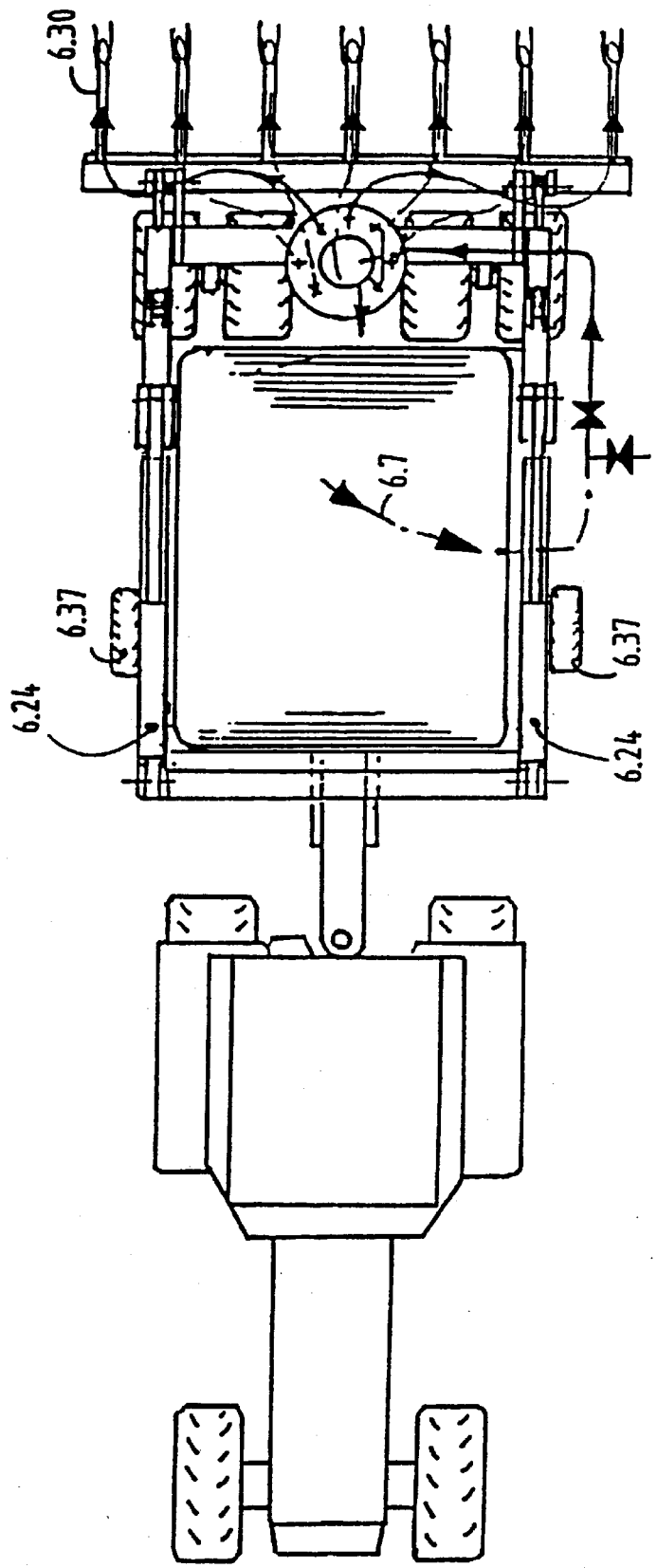

FIGS. 6a, 6b and 6c show a frame 6.22 which is embodied such that the container 6.1 received in the frame 6.22 can be replaced by a full container.

FIG. 6b shows how the frame part 6.39 with frame wheels 6.26 and manure distribution unit 6.29, 6.30 can be hingedly raised using lifting cylinders 6.24 to such an extent that container 6.1 can be exchanged by swinging aside the container enclosing roller 6.36 and supporting the frame on the ground on support wheels 6.37 extended from the frame using hydraulic cylinders 6.38.

Figure 5B:
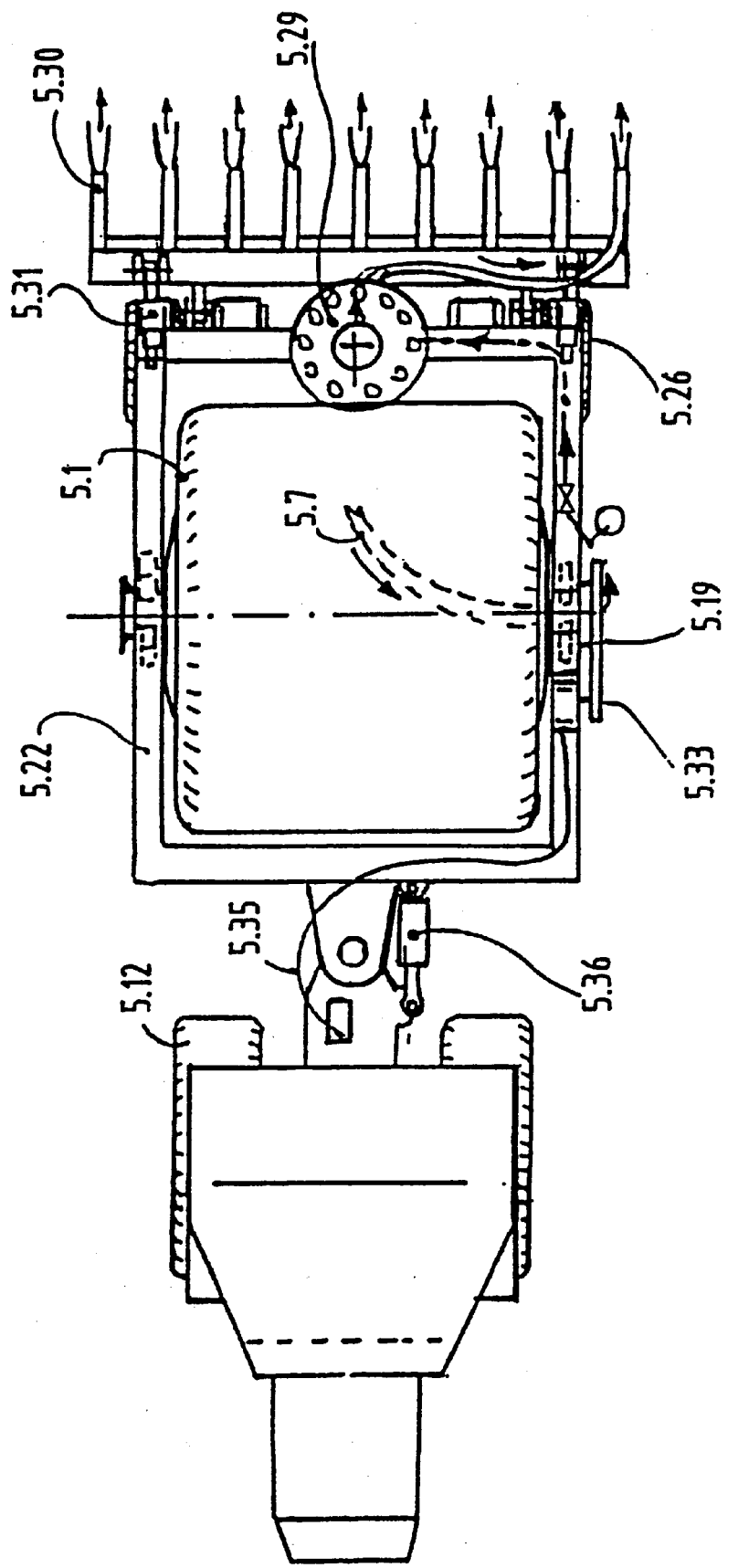

The possibilities of mixing the container content and of driving the frame using the container are identical to the embodiments of FIG. 4 and 5, but are not shown again here. The same applies to the self-propelling embodiment shown in FIGS. 5a and 5b.

FIGS. 6a and 6b show the situation wherein the container content can be spread in or over the ground using conduit 6.7, pump 6.28 and distribution unit 6.29, 6.30. Using lifting cylinders 6.24 the container can be lifted clear of the ground or road 6.32. The distribution unit 6.30 can be lifted clear of the ground or road with lifting cylinders 6.31.

Figure 7A:
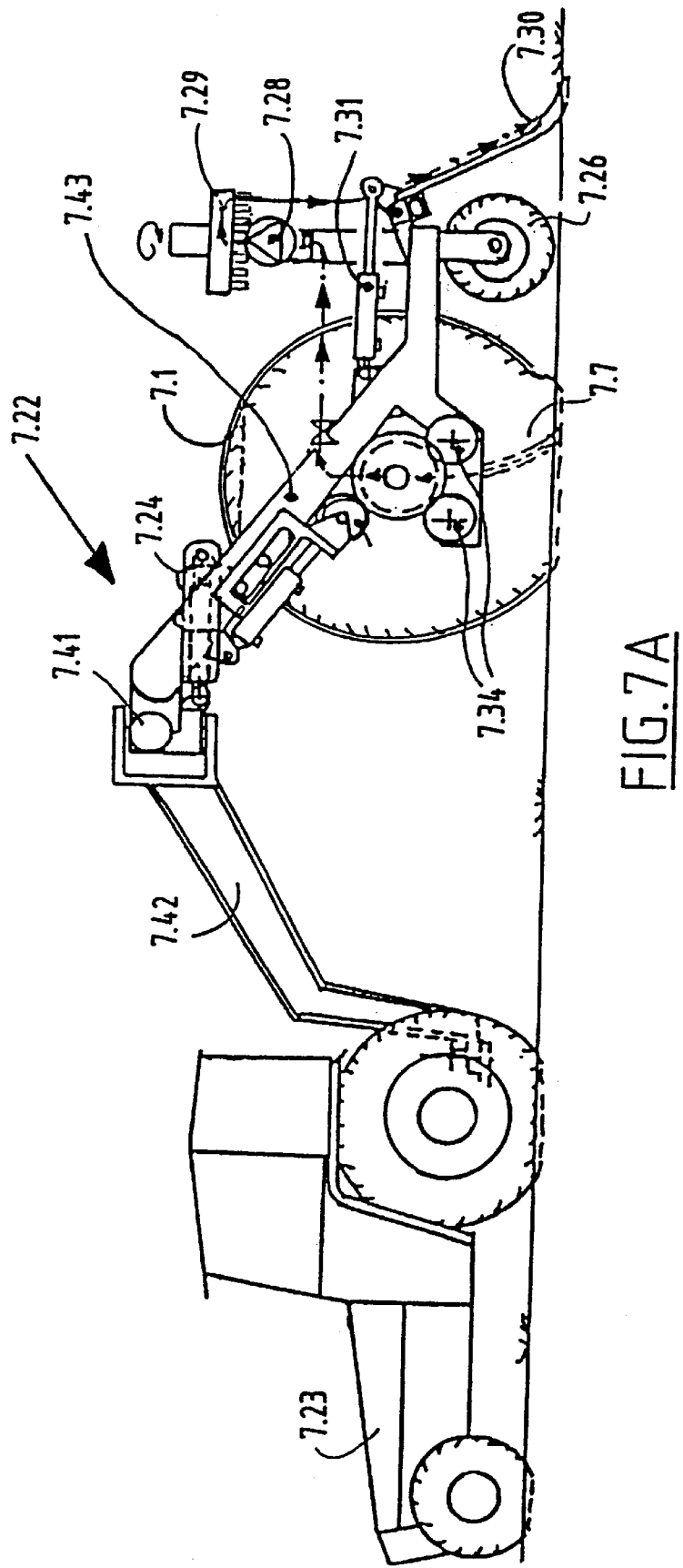
FIG. 7a is a view corresponding with FIG. 4a of yet another embodiment.
Figure 7B:
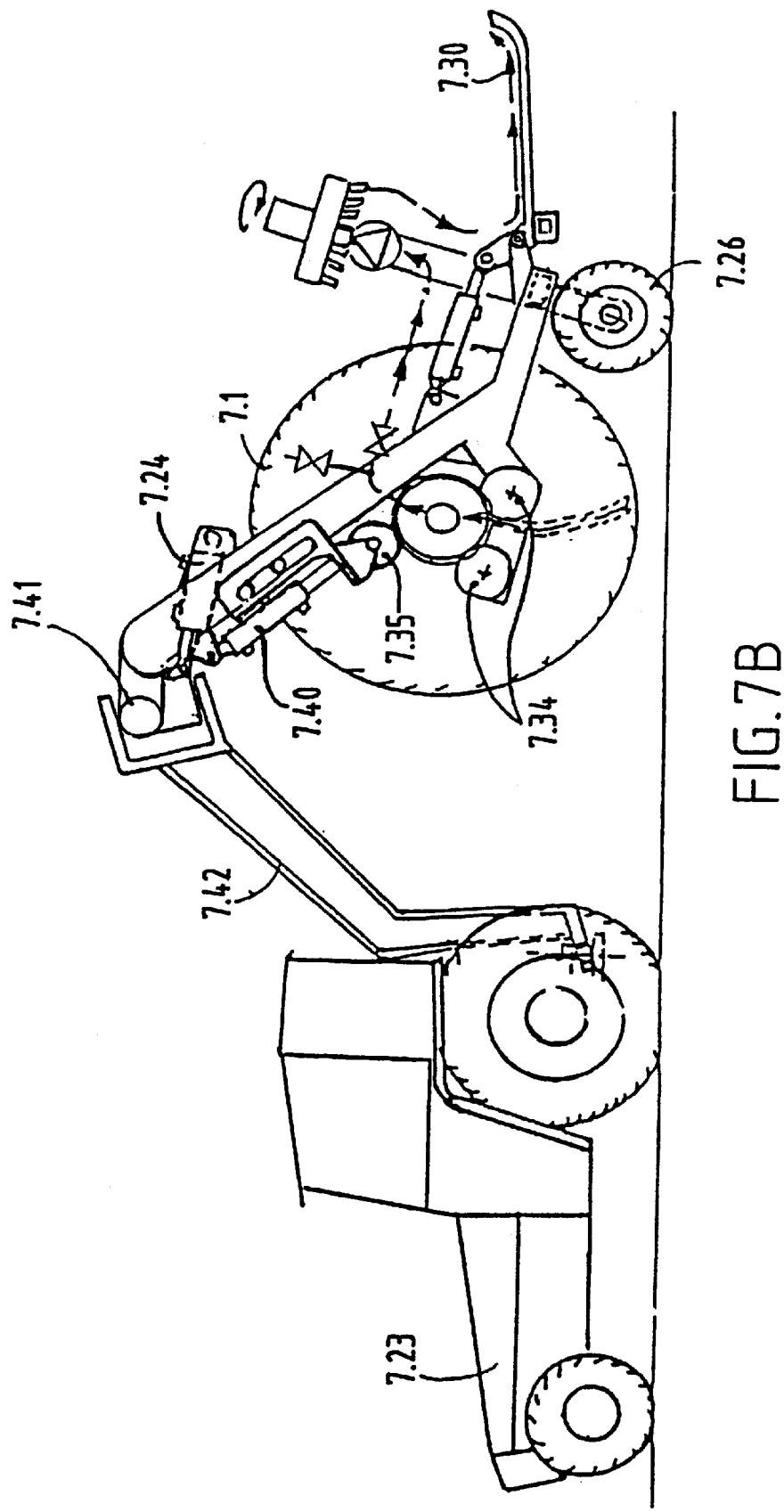
FIG. 7b shows a view corresponding with FIG. 7a of a situation in which the container is lifted from the ground, as in FIG. 4b.
Figure 7C:
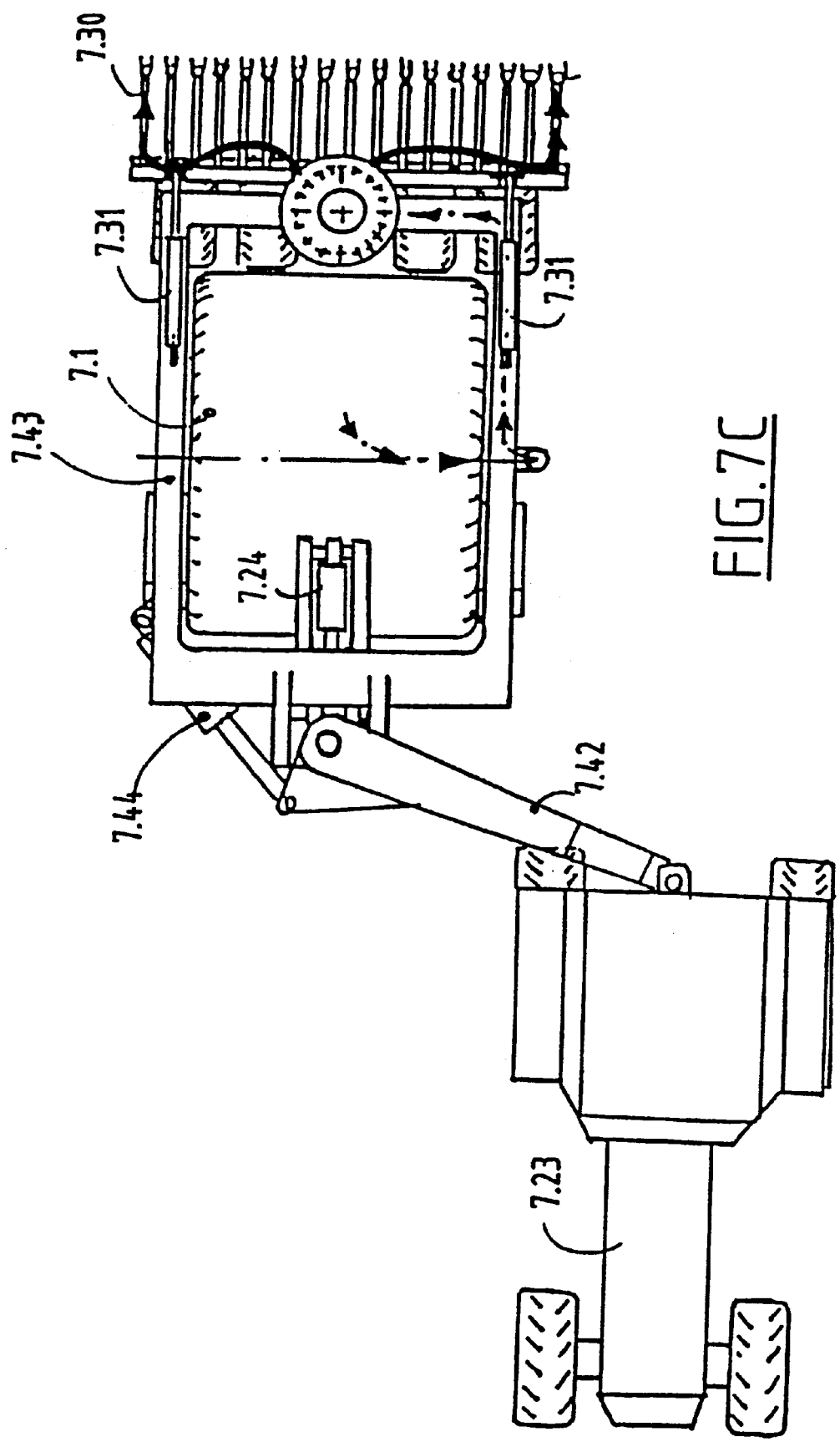
FIG. 7c is a top view of the embodiment according to FIGS. 7a and 7b.

FIGS. 7a, 7b, 7c show a frame 7.22 embodied sch that an empty container 7.1 can be exchanged on the front side of the frame 7.22.

FIG. 7a shows the frame 7.22 in the position herein the content of the container 7.1 is spread via conduit 7.7, pump 7.28 and distribution unit 7.29, 7.30. The distribution unit 7.30 can be lifted clear of the ground or road with lifting cylinders 7.31.

FIG. 7b shows the frame 7.22 in a position wherein container 7.1 is lifted clear of the ground or road. The frame halves 7.42 and 7.43 are urged toward each other pivotally on shaft 7.41 by lifting cylinder 7.24, whereby container 7.1 supported by bearing rollers 7.34 is lifted. The container is enclosed for rotation in the frame using rollers 7.35 and hydraulic cylinders 7.40.

FIG. 7c shows the position of the frame 7.22 wherein container 7.1 can be replaced. Using hydraulic cylinder 7.44 the frame 7.22 is urged into this angled position. After lifting the distribution unit 7.30 using hydraulic cylinders 7.31 and sliding the bearing rollers 7.35 along the frame part 7.43 and some spreading of the frame parts 7.42 and 7.43, whereby container 7.1 comes to be released from bearing rollers 7.34, the frame 7.22 can be moved clear of container 7.1 by driving the vehicle 7.23 in reverse, after conduit 7.7 and possible other conduits have been disconnected. According to the reverse procedure a filled container 7.1 can be arranged in the frame 7.22. The frame 7.22 also has the advantage that in applying manure close to ditches the vehicle 7.23 can travel at a distance from this ditch in a "dog walk".

Figure 8A:
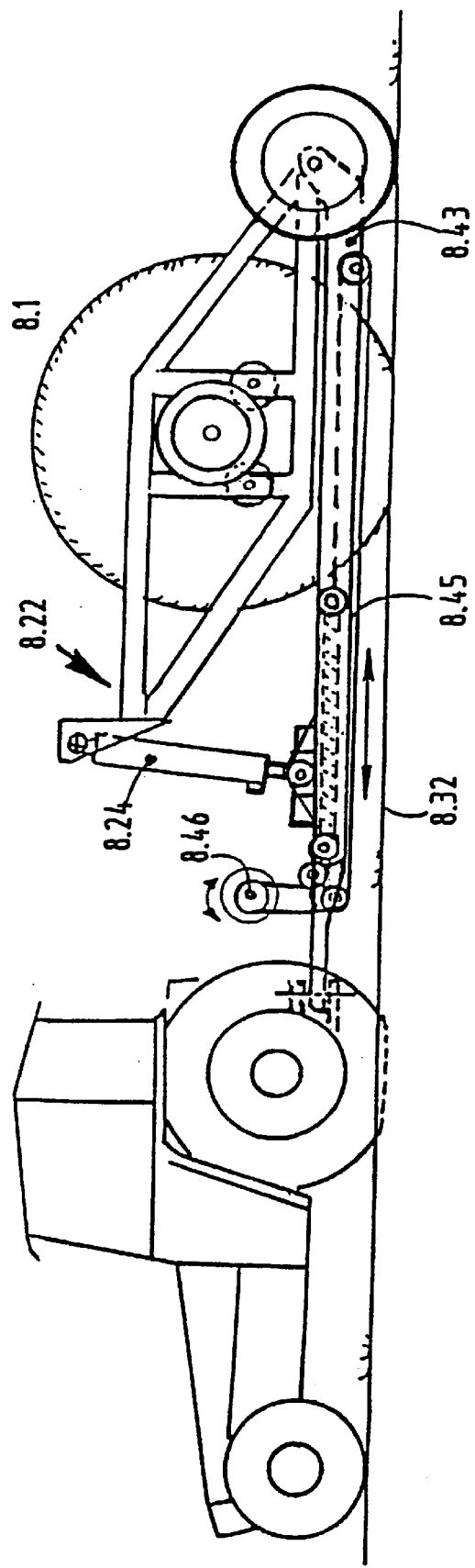
FIG. 8a is a side view of a subsequent embodiment in a situation in which the container can roll over the ground.
Figure 8B:
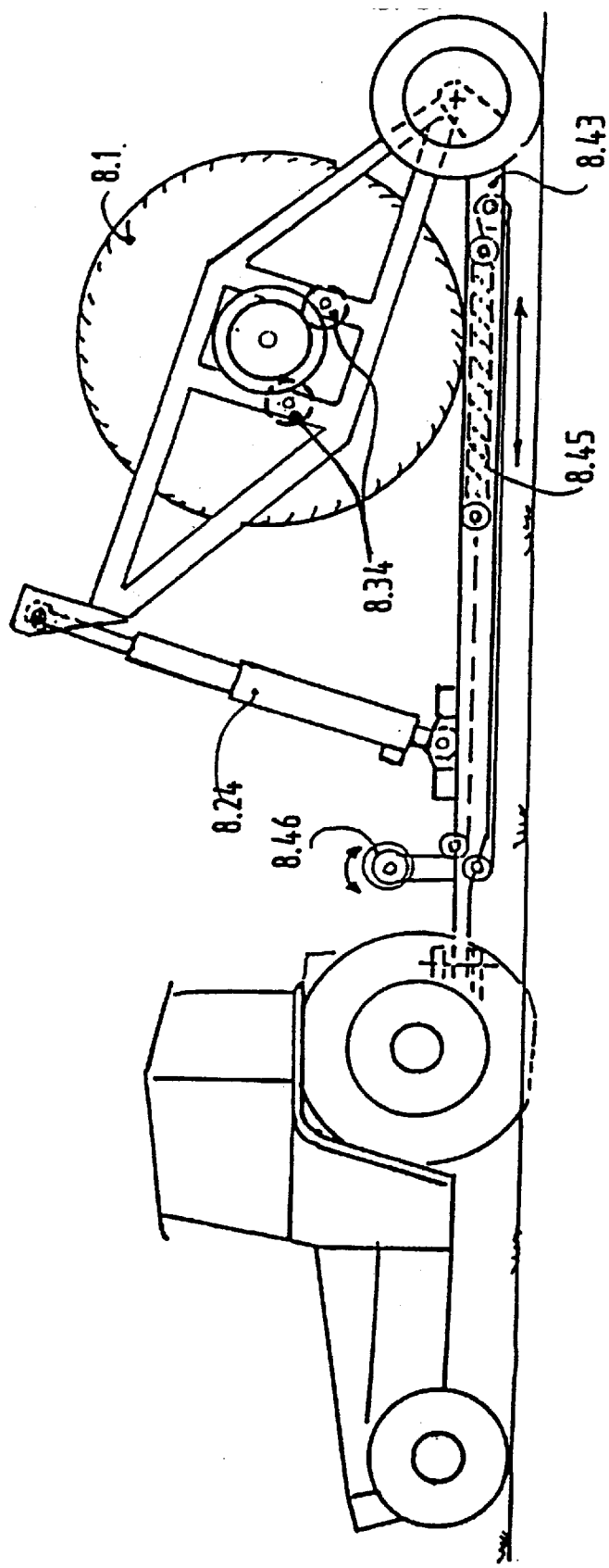
FIG. 8b shows a view corresponding with FIG. 8a of the position in which the container is lifted from the ground.

FIGS. 8a and 8b show a frame 8.22 wherein for transport by road the container 8.1 can be lifted clear of the ground or road using the lifting cylinder in the frame, whereafter a platform slidable in frame part 8.43 is pushed under the lifted container 8.2 using winch 8.46. Winch 8.46 can be driven as desired by hand, hydraulically or electrically. Using lifting cylinder 8.24 the container 8.1 can now be supported on platform 8.45.

This manner of support is particularly important if the container 3.1 with a flexible cylindrical part is used and if without support platform 8.45 dangerous low frequency resonances could occur during transport over terrain or road.

FIG. 8A shows the situation wherein container 8.1 is supported on the ground 8.32 and the container content can be spread onto or into the land.

Figure 9A:
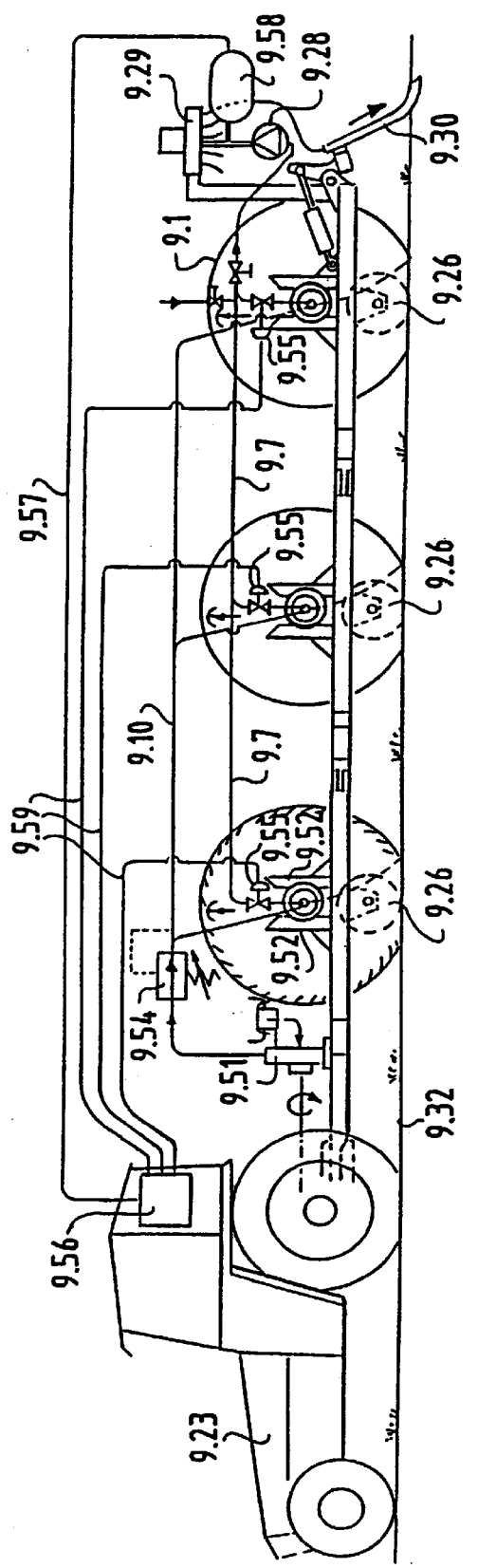
FIG. 9a shows a side view of an embodiment in which three frames, each with three containers embodied as wheels, can be moved forward by a tractor.
Figure 9B:
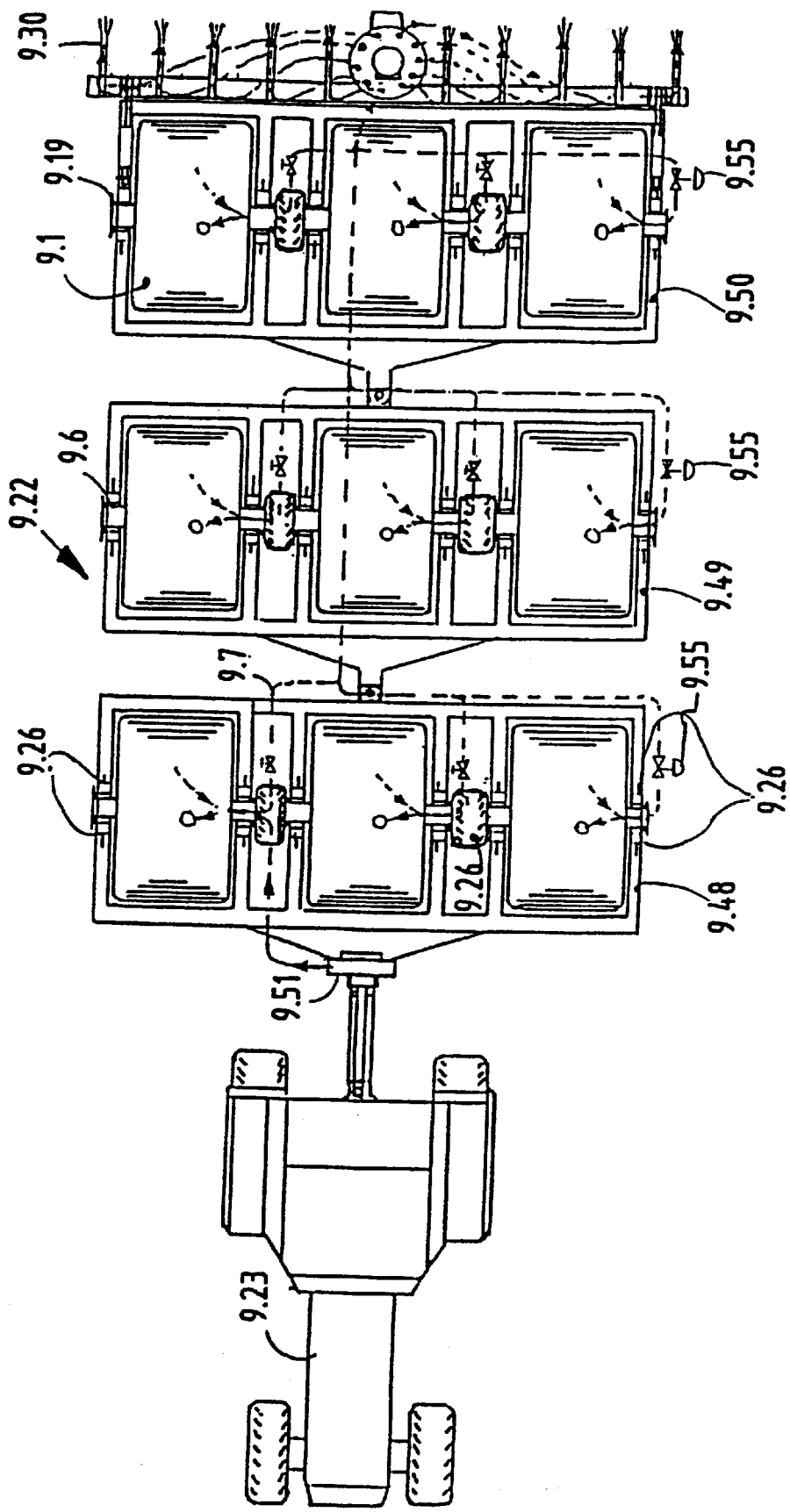

FIGS. 9A and 9B show a frame in which more than one container 9.1 is arranged. Per frame section 9.48, 9.49 and 9.50 are arranged three containers 9.1. Each frame section has in this example two frame wheels 9.26. The containers are enclosed with container pipe pieces 9.6 between vertical profiles 9.52 such that the containers 9.1 are supported on the terrain or road. The compressor 9.51 driven by vehicle 9.23 can maintain an overpressure in the container which is set using control valve 9.54 and conduit 9.10, which facilitates emptying of the containers by pump 9.28 and can have a positive effect on the form retention when very flexible containers are used. With the frame shown here effective operation can take place when pump 9.28 draws from one container 9.1 at a time and, as soon as the pump pressure falls away as a result of the fact that the relevant container is empty, the driver of vehicle 9.23 closes the relevant valve 9.55 and opens that of a still full container. It is practical to automate this process. FIG. 9A shows how this could function. Arranged between pump 9.28 and distributor 9.29 is a pressure sensor 9.58 which can cause the PLC 9.56 in the cab of vehicle 9.23 to decide, when a pressure is under a set value, to close the then open valve 9.55 with the relevant control line 9.59 and to open one of the valves 9.55 which have not yet been open, unless the driver decides otherwise. Since in view of the width the frame 9.22 is also not designed for road transport, but purely for applying manure substances to large areas of agricultural land, few demands have to be made of the bearing between container 9.1 and frame 9.22 and bearing rollers as shown in FIGS. 4–8 can be omitted. Occasional greasing of pipe pieces 9.6 and the support beams of profiles 9.52 can sufficiently limit friction and wear between these parts. If the containers 9.1 are supplied full, by for instance a truck, the empty containers can be replaced by full ones with a hoisting device. Flanges 9.19 of pipe pieces 9.6 can serve as hoist connection points. Conduits 9.7 and 9.10 must of course be disconnected when containers are exchanged.

Figure 10A:
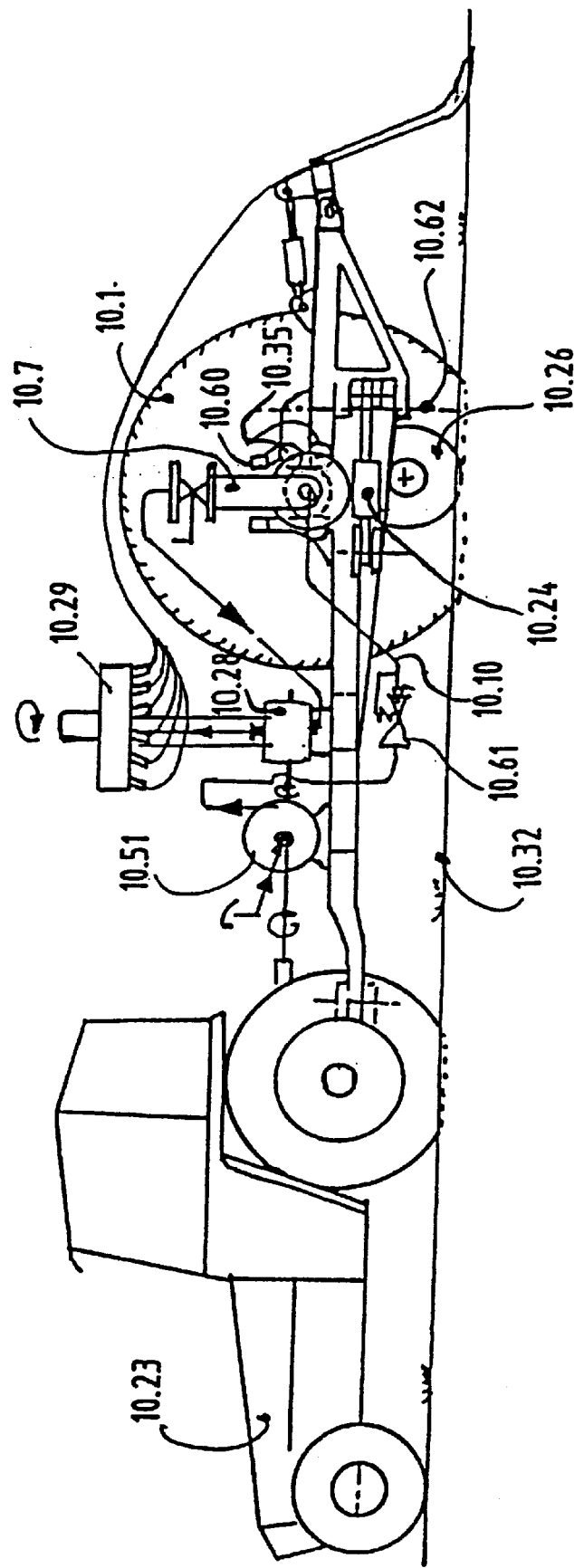
FIG. 10a shows an embodiment in which the container can be removed via the rear side.
Figure 10B:
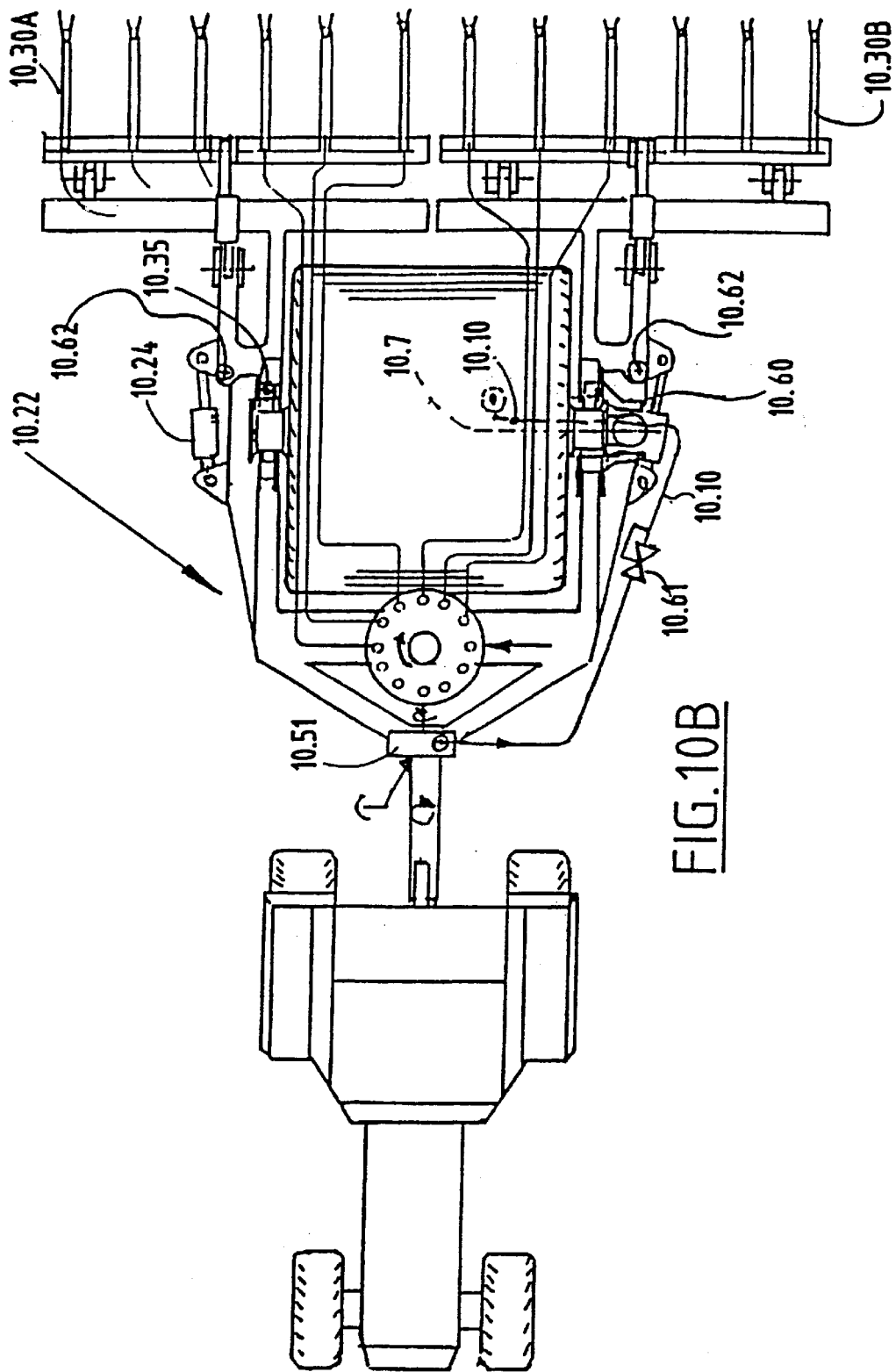

FIGS. 10A and 10B show a frame 10.22 embodied such that container 10.1 can be exchanged at the rear in that the distribution unit consists here of two parts, namely 10.30A and 10.30B, which can be rotated in the horizontal plane through about 90° using hydraulic cylinders 10.24. The rear enclosing bearing rollers 10.35, with which the container 10.1 is enclosed in the frame, form part of the distribution units 10.30A and 10.30B which swing away to the sides, whereby after disconnection of the conduits 10.10 and 10.7 the container is released from the frame 10.22 when the frame is moved forward. In reverse manner a container can thus be enclosed in frame 10.22. When the distribution units 10.30A and 10.30B are rotated into the operating position on shafts 10.62, the stop 10.60 which forms part of distribution unit 10.30B encloses container conduit 10.7 such that it cannot co-rotate with the container. In FIG. 10A the frame wheels 10.26 are fixedly connected with the shafts to the frame 10.22, whereby there is no possibility here of lifting the container 10.1 clear of the ground or road 10.32. If desired, this can be embodied here as in FIG. 5. FIGS. 10A and 10B further show the possibility of driving both compressor 10.51 and pump 10.28 by the mechanical power take-off of vehicle 10.23. With compressor 10.51 and pressure reduction valve 10.61 a desired pressure can be maintained in container 10.1 using conduit 10.10. Pump 10.28 transports the container content via conduit 10.7 to distributor 10.29, from where it is carried into or onto the agricultural land via the distribution units 10.30A and 10.30B.

FIGS. 11A and 11B show a container in a frame 11.22, wherein the container is embodied flexibly at its periphery. The container head ends 11.3 and 11.4 are held in the same position relative to each other by the frame 11.22 using bearing rollers 11.34. A connection through the container 11.1 using a shaft or pipe can hereby be omitted and the filling/suction conduit 11.7 can be coupled fixedly to the pipe passage in head end 11.3. By manufacturing the filling/suction conduit 11.7 from a flexible material such as for instance rubber, the outer end of conduit 11.7 will, as a result of its own mass, remain close to the container bottom during the rolling displacement of the container, which is necessary for emptying the container while it is rolling. The filling/suction conduit 11.7 can be closed with valve 11.63. Outside the container the flexibly embodied conduit 11.7 is fixedly connected to valve 11.63 and will thus co-rotate with the container just as the internal conduit 11.7. The external conduit 11.7 can be guided in a curve to a pump mounted on the frame and can be connected thereto using a rotating and sealing coupling.

In FIG. 11A is also shown how conduit 11.10 for the container pressure control takes a flexible form but can still be held with its outer end in the top of container 11.1. A curved metal rod 11.64 coupled via valve 11.65 to the frame 11.22 ensures the desired position of rotating conduit 11.10. A coating 11.68 applied to the rod limits the friction between rod 11.64 and the pressure control conduit 11.10 rotating round the rod. Arranged under valve 11.65 is a rotating coupling 11.66 which ensures that conduit 11.10 is fixedly connected to head end 11.4 and can rotate freely round rod 11.64 and herein also provides a liquid-tight and gas-tight connection 11.67 between valve 11.65 and rotating conduit 11.10.

I claim:

1. A rollable container for storing, transporting and distributing a mass having substantially no cohesion, comprising:
   the container configured as a hollow wheel defining a hollow space and
   distributing means adapted to operate during driving transport of the container for removing from the container by means of pump means the mass stored in the container and for controlled distribution of the mass onto the ground by means of a distributing device,
   wherein the container is mounted via rotation bearings for rotation in a frame,
   wherein the frame is configured to be coupled by coupling means to a motor vehicle,
   wherein the hollow space in the container is sealingly connected via one of the rotation bearings to a supply and discharge conduit which occupies a substantially fixed position relative to the frame,
   wherein the supply and discharge conduit is configured to supply and discharge the mass to and from the hollow space during rotation of the container and when the container is stationary,
   wherein the container is configured to roll over the ground during movement of the frame,
   wherein the container is dimensioned and configured to assume a stable upright position without attachment to the frame, and
   wherein on a rear zone of the frame, the frame carries the distributing device which is configured to fold aside such that after folding aside the container is accessible enabling removal of the container from the frame.

2. The container as claimed in claim 1, wherein the container has a form-retaining outer surface.

3. The container as claimed in claim 1, wherein the container has an elastically deformable outer surface.

4. The container as claimed in claim 3, wherein the outer surface forms a boundary of the hollow space.

5. The container as claimed in claim 1 wherein end walls of the container are elastically deformable.

6. The container as claimed in claim 5, wherein a central zone of each of the end walls is form-retaining and supports the rotation bearings.

7. The container as claimed in claim 1, wherein the supply and discharge conduit extends into the hollow space and includes a flexible portion positioned in a lowest region of the hollow space of the container.

8. The container as claimed in claim 7, wherein the at least one supply and discharge conduit is fixedly connected to a feed-through which is positioned coaxial with the container and fixedly connected thereto and which is connected via a rotatable coupling to a conduit part which is substantially stationary relative to the frame such that a free end of the flexible portion of the supply and discharge conduit is situated under the force of gravity in the lowest region of the hollow space.

9. The container as claimed in claim 1, further comprising pressure means for carrying into the hollow space and holding therein gas under pressure, the pressure means comprising:
   a source of gas under pressure; and
   a gas pressure conduit which is substantially stationary relative to the frame and which extends into the hollow space via one of the rotation bearings and debouches into the hollow space in a highest region thereof.

10. The container as claimed in claim 9, wherein the gas pressure conduit is flexible and is fixedly connected to a feed-through which is positioned coaxial with the container and is held in a curved position by an internal curved guide rod such that the gas pressure conduit debouches into the highest region of the hollow space, and wherein the internal curved guide rod is arranged substantially stationary relative to the frame and the gas pressure conduit is connected via a rotatable coupling to a conduit part which is substantially stationary relative to the frame.

11. The container as claimed in claim 10, wherein the container is connected to the frame by at least two bearings coaxial with the container on either side of the container, and wherein the bearings mutually position, a central zone of end walls of the container fixedly in relation to each other in order to absorb forces resulting from underpressure in the container and to at least partially lift the container from the ground such that a rigid mechanical coupling between the end walls of the container can be omitted.

12. The container as claimed in claim 1, further comprising support means configured to be placed under the container in a raised position of the container to support the container.

13. The container as claimed in claim 1, further comprising drive means for rotatably driving the container.

14. The container as claimed in claim 1, wherein the coupling means is adjustable such that the motor vehicle and the container can have a mutual distance such that the container is removable via a front side of the frame.

15. The container as claimed in claim 1, wherein the frame supports a plurality of the containers.

16. The container as claimed in claim 15, wherein a discharge conduit is connected onto each of the containers, and wherein each of the discharge conduits is selectively connectable to a pump means by a selection means.

17. The container as claimed in claim 1, wherein a discharge conduit is connected onto the container, and wherein the discharge conduit is selectively connectable to the pump means by selection means.

18. The container as claimed in claim 17, further including a plurality of the containers and wherein the selection means further comprises:
   a central control unit; p1 a valve positioned in the discharge conduit from each of the containers and configured to be openable and closable by the central control unit; and
   at least one of a flow rate sensor and a pressure sensor placed downstream of the pump means configured to signal the central control unit a lack of at least one of pressure and flow, wherein the central control unit is configured to respond to the signal by closing an open valve and opening another valve corresponding to another at least partially filled container.

19. A rollable container for storing, transporting and distributing a mass having substantially no cohesion, comprising:
   the container configured as a hollow wheel defining a hollow space, wherein the container is mounted via rotation bearings for rotation in a frame;
   lifting means positioned between the frame and the container for lifting the container from the ground;
   at least one support wheel positioned on the frame and adapted to roll over the ground;
   adjusting means for adjusting the force exerted on the ground by the at least one support wheel; and
   a linear motor positioned between the frame and an angle frame bearing the container, wherein the linear motor is configured to exert force in two directions,
   wherein the frame is configured to be coupled by coupling means to a motor vehicle,
   wherein the hollow space in the container is sealingly connected via one of the rotation bearings to a supply and discharge conduit which occupies a substantially fixed position relative to the frame,
   wherein the supply and discharge conduit is configured to supply and discharge the mass to and from the hollow space during rotation of the container and when the container is stationary,
   wherein the container is configured to roll over the ground during movement of the frame, and
   wherein the container is dimensioned and configured to assume a stable upright position without attachment to the frame.

20. The container as claimed in claim 19, wherein the adjusting means are adapted to lift the container from the ground.

21. The container as claimed in claim 19, wherein the adjusting means are adapted to adjust gas pressure in the at least one support wheel.

22. The container as claimed in claim 19, wherein the linear motor is a double-action hydraulic cylinder.

* * * * *

UNITED STATES PATENT AND TRADEMARK OFFICE
CERTIFICATE OF CORRECTION

PATENT NO. : 6,000,349
DATED : December 14, 1999
INVENTOR(S) : Johan Sterken

It is certified that error appears in the above-identified patent and that said Letters Patent is hereby corrected as shown below:

Column 5 Line 12 "sch that" should read --such that--.

Column 5 Line 15 "herein" should read --wherein--.

Column 7 Line 61, Claim 5, after "in claim 1" insert comma --,--.

Column 8 Line 33, Claim 11, after "position" delete comma --,--.

Column 8 Line 39, Claim 12, "in claim 1" should read --in claim 19--.

Column 8 Line 62, Claim 18, after "control unit;" delete "p1" and insert new paragraph.

Signed and Sealed this

Twelfth Day of September, 2000

Attest:

Q. TODD DICKINSON

Attesting Officer     Director of Patents and Trademarks